April 1, 1924.  
M. M. ALPAUGH  
AUTOMATIC DRAINING DEVICE  
Filed July 19, 1922

1,488,630

M. M. Alpaugh  
INVENTOR  
BY Victor J. Evans  
ATTORNEY

WITNESS:

Patented Apr. 1, 1924.

1,488,630

UNITED STATES PATENT OFFICE.

MATHIAS M. ALPAUGH, OF ANNANDALE, NEW JERSEY.

AUTOMATIC DRAINING DEVICE.

Application filed July 19, 1922. Serial No. 576,078.

*To all whom it may concern:*

Be it known that I, MATHIAS M. ALPAUGH, a citizen of the United States, residing at Annandale, in the county of Hunterdon and State of New Jersey, have invented new and useful Improvements in Automatic Draining Devices, of which the following is a specification.

My present invention has reference to radiators for automobiles, and is particularly directed to a means for automatically draining the radiator to prevent the freezing of the water therein during cold weather.

An object of the invention is to produce an electrically operated drain for automobile radiators and motors in which a gauge is provided that may be set to cause the draining of the radiator at any determined degree of temperature.

A further object is to produce a device of this character which may be attached to any ordinary construction of automobile or other radiators where it is desired that the same be drained under certain weather conditions, and which, in connection with a manually operated drain pipe includes a drain outlet that is normally closed by a fusible plug, the device also including a thermostatically influenced member designed to influence a contact member or switch to bring the same into engagement with the second contact member or switch to establish an electric circuit through suitable conductors connected with a battery and including a heating coil designed to melt the fusible plug and to permit the draining of the water from the radiator through the opening closed by the plug.

The foregoing, and many other objects which will present themselves as the nature of the invention is better understood, may be accomplished by a construction, combination and operative association of parts, such as is disclosed by the drawing which accompanies and which forms part of this application.

In the drawing:—

Figure 1:
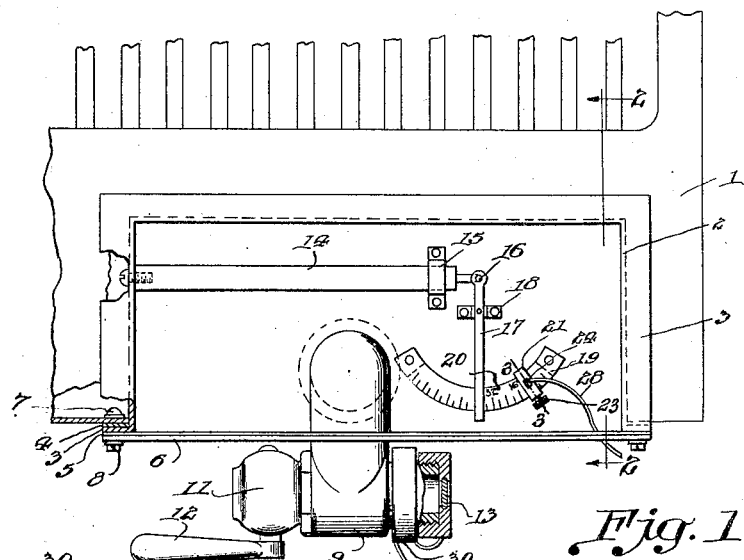
Figure 1 is a view of a sufficient portion of an automobile or similar radiator to illustrate the application of the improvement thereto, parts of the latter being in section.
Figure 5:
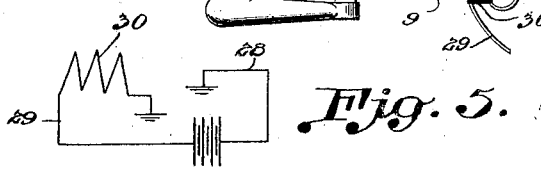
Figures 4 and 5 illustrate details.
Figure 2:
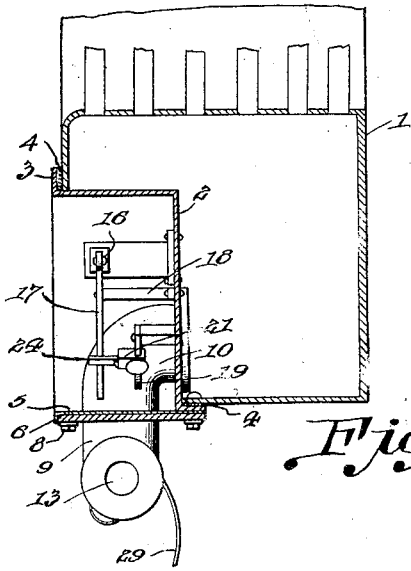
Figure 2 is a sectional view on the line 2—2 of Figure 1.
Figure 4:
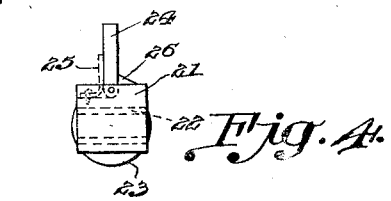
Figure 3:
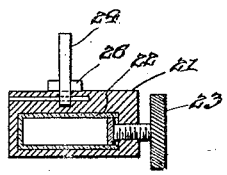
Figure 3 is a sectional view on the line 3—3 of Figure 1.

As disclosed by the drawing, I let in the bottom of a radiator 1 a substantially rectangular casing 2. The casing has its bottom open but is provided with a continuous flange 3, and on this flange there is a plate or gasket of insulating material 4 to thermally insulate the casing 2 from the radiator. Also on the outer face of the flange 3 there is a gasket 5 that is contacted by a closure plate 6 for the casing 2, suitable securing means, such as bolts 7 that are engaged by nuts 8 passing through the bottom of the radiator, the insulating elements 4 and 5, the flange 3, and the closure plate 6.

If desired, the outer face of the casing 2 may be open or the same may be closed by a transparent plate, and the said casing has entering from the bottom thereof a cock casing 9 of a peculiar construction. The casing 9 is substantially in the nature of an inverted T member, the central branch of which entering the bottom of the casing and having an angle extension 10 that passes through the side of the casing to communicate with the water in the radiator. The head of the T member has the passage through one of its ends controlled by a valve 11, the stem of the valve having connected therewith an operating handle 12. The opposite end of the head is closed by a fusible plug 13.

In the casing 2, and having one of its ends secured to one side thereof there is a thermostatically influenced bar 14. The bar is supported adjacent to its opposite end in a suitable bracket 15, the said end of the bar having a pivot or elbow connection 16 with an arm 17 that is pivotally connected to a supporting bracket 18 in the casing.

In the casing there is secured an indicator 19. The indicator is in the nature of a flat dial plate segmental in plan, the ends of which being spaced from the casing by the supporting means therefor, and on the indicator there is a degree scale 20. The arm 17 is arranged for swinging over the indicator 19. On the segmental plate 19 there is a slidable collar 21, the same being insulated from the indicator plate, as indicated by the numeral 22. The collar has a threaded opening in which is threaded a screw 23 that is designed to contact with one of the edges of the plate 19 for adjusting the collar on the said plate. Pivotally secured to the slidable collar 21 there is a contact finger 24, the said finger being influenced by a spring 25 against a stop element 26 also arranged on the slidable collar. The contact element 24 has connected therewith one end of a wire 28 which is connected at its other end with the battery for the automobile to which the radiator is attached, the battery not being shown. The second wire or conductor from the battery, indicated by the numeral 29, is connected with a heating coil 30 arranged around one of the ends of the head of the T member 9 and is also connected with the fusible plug 13.

The bar 14 is, as stated, thermostatically influenced. The slidable collar is brought opposite the desired degree mark on the scale plate 19 at which the radiator is to be drained. The element 14 influencing the arm 17 will cause the said arm to engage with the contact 24. The arm 17 is really in the nature of a switch member or contact, being constructed of metal, and having metallic connections with the element 14, and the latter with the metallic casing, with the result that an electric circuit will be completed, the coil 30 will be heated and will cause the plug 13 to melt so that the water will be automatically drained from the radiator.

It is believed that the foregoing description, when taken in connection with the drawing will fully set forth the construction, operation and advantages of the improvement to those skilled in the art to which this invention relates, but it is to be stated that the nature of the invention is such as to render the same susceptible to changes, and therefore I desire it understood that I am not to be restricted to the precise structure herein illustrated and described, but may make all such changes therefrom as fall within the scope of what I claim.

Having described the invention, I claim:—

1. The combination with a water radiator, of means for automatically draining the same at any desired degree of temperature, comprising a pipe member communicating with the bottom of the radiator, a fusible plug closing the outlet therefor, a heating coil around said outlet, a thermostatically influenced member, a pivoted switch arm influenced thereby, a contact in the path of movement of the switch arm, means for adjusting the contact with respect to the said arm, and said arm, contact and heating coil being in an electric circuit.

2. The combination with a water radiator, of a means for automatically draining the same at any desired degree of temperature, comprising a pipe member connected with the bottom of the radiator, a fusible plug closing the outlet passage of the pipe, a heating coil around said outlet and connected with the plug, a thermostatically influenced member connected with the radiator but insulated therefrom, guide means therefor, a pivotally supported switch arm having a loose connection with said thermostatically influenced member, a segmental dial plate over which the arm is designed to swing, said plate having degree marks thereon, a slidable contact on the dial plate, insulated therefrom and in the path of movement of the arm, and said arm, contact and coil being in an electric circuit.

3. The combination with a water radiator, of a means for automatically draining the same at any determined degree of temperature, comprising a casing let in the bottom of the radiator, secured thereto and insulated therefrom, a pipe member in the nature of an inverted T having its central branch entering the bottom of the casing and communicating with the water in the radiator, a valve closing an outlet in one end of the head of the T, a fusible plug closing an outlet in the other end of said head, a heating coil around said last mentioned end and connected to the fusible plug, a thermostatically influenced member having one end secured in the casing, a guide for the opposite end thereof, a pivoted arm comprising a switch loosely connected to said opposite end of the member, a segmental plate secured in the casing but spaced from the walls thereof over which the switch arm is designed to swing, a slidable collar thereon insulated therefrom, means holding the collar at any determined point on the plate, a spring influenced contact member pivoted to the collar, a stop on the collar therefor, said contact member being in the path of movement of the switch arm, and said casing, contact member and heating coil being in circuit with a source of electricity.

In testimony whereof I affix my signature.

MATHIAS M. ALPAUGH.